(12) United States Patent
Lisi et al.

(10) Patent No.: US 9,077,192 B2
(45) Date of Patent: Jul. 7, 2015

(54) TRANSMITTER AND RECEIVER TUNING IN A WIRELESS CHARGING SYSTEM

(75) Inventors: Gianpaolo Lisi, Campbell, CA (US); Gerard G. Socci, Palo Alto, CA (US); Ali Kiaei, San Jose, CA (US); Kosha Mahmodieh, Hayward, CA (US); Ali Djabbari, Saratoga, CA (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 1071 days.

(21) Appl. No.: 13/150,868

(22) Filed: Jun. 1, 2011

(65) Prior Publication Data

US 2012/0169133 A1     Jul. 5, 2012

Related U.S. Application Data

(60) Provisional application No. 61/428,126, filed on Dec. 29, 2010.

(51) Int. Cl.
*H02J 5/00*     (2006.01)

(52) U.S. Cl.
CPC ...................................... *H02J 5/005* (2013.01)

(58) Field of Classification Search
CPC ....................................................... H02J 5/005
USPC ....................................................... 702/107
See application file for complete search history.

(56) References Cited

U.S. PATENT DOCUMENTS

| | | | |
|---|---|---|---|
| 3,435,344 A * | 3/1969 | Blair et al. ..................... | 455/265 |
| 4,458,248 A * | 7/1984 | Lyasko ......................... | 343/719 |
| 7,741,734 B2 | 6/2010 | Joannopoulos et al. | |
| 2010/0034238 A1 | 2/2010 | Bennett | |
| 2010/0036773 A1 | 2/2010 | Bennett | |
| 2010/0244576 A1 | 9/2010 | Hillan et al. | |
| 2010/0276995 A1 | 11/2010 | Marzetta et al. | |

OTHER PUBLICATIONS

Hideaki Abe, et al., "A Noncontact Charger Using a Resonant Converter with Parallel Capacitor of the Secondary Coil" 2000 IEEE Xplore.

Chwei-Sen Wang, et al., "Power Transfer Capability and Bifurcation Phenomena of Loosely Coupled Inductive Power Transfer Systems", 2004 IEEE Xplore.

R. Laouamer, et al., "A Multi-Resonant Converter for Non-Contact Charging with Electromagnetic Coupling," Jul. 22, 2010, IEEE Xplore.

Andre Kurs, et al., "Wireless Power Transfer via Strongly Coupled Magnetic Resonances," Science Express, Jun. 2007.

(Continued)

*Primary Examiner* — Bryan Bui (74) *Attorney, Agent, or Firm* — Andrew Viger; Frank D. Cimino (57) ABSTRACT

A wireless charging system includes a transmitter with tunable reactive components (such as capacitance or inductance). A metric related to power transfer from the transmitter through a coil is used to determine an amount to modify a Parameter. One metric is equal to $|Vs| \cdot |Is| \cdot \cos(\phi) \cdot (Vcoil\_ref/Vcoil)$, where $|Vs|$ is magnitude of the power source voltage, $|Is|$ is magnitude of the power source current, $\phi$ is phase difference between the power source voltage and power source current, Vcoil_ref is a normalization value, and Vcoil is voltage across the coil. The transmitter can further include a phase tracking and adjustment loop (such as a phase-locked loop).

12 Claims, 4 Drawing Sheets

(56) References Cited

OTHER PUBLICATIONS

Yuequan Hu, et al.; "Universal-Input Single-Stage PFC Flyback with Variable Boost Inductance for High-Brightness LED Applications," IEEE (2010).

G. Vandevoorde, et al.; "Wireless energy transfer for stand-alone systems: a comparison between low and high power applicability," Published by Elsevier Science B.V. (2001).

Xiao Zhi Jian, et al.; "A Novel Wirless Charging System for Movable Telephone with Printed-circuit-board WIndings of Different Structure and Shape Respectively," International Conference on Electrical Machines and Systems Oct. 8-11, 2007, Seoul, Korea.

Jun Pan, et al.; "A Self-Powered Sensor Module Using Vibration-Based Energy Generation for Ubiquitous Systems," IEEE (2005).

Geffrey K. Ottman, et al.; "Adaptive Piezoelectric Energy Harvesting Circuit for Wireless Remote Power Supply," IEEE (2002).

C.-C., Tsai, B., et al.; "Design Wireless Transcutaneous Energy Transmission System for Totally Artificial Hearts," IEEE (2000).

David L. Mascarenas, et al.; "Experimental studies of using wireless energy transmission for powering embedded sensor nodes," Journal of Sound and Vibration, Published by Elsevier Ltd. (2009).

Jonsensor Zhao,; "A new calculation for designing multilayer planar spiral inductors," EDN (Jul. 29, 2010).

Takehiro Imura, et al, "Basic Experimental Study on Helical Antennas of Wireless Power Transfer for Electric Vehicles by using Magnetic Resonant Couplings," IEEE (2009).

Aristeidis Karalis, et al., "Efficient wireless non-radiative mid-range energy transfer," Elsevier, Science Direct, Annals of Physics, (2007).

\* cited by examiner

TRANSMITTER AND RECEIVER TUNING IN A WIRELESS CHARGING SYSTEM

CROSS REFERENCE TO RELATED APPLICATIONS

The present application claims benefit to U.S. provisional application 61/428,126 filed Dec. 29, 2010 entitled TRANSMITTER AND RECEIVER TUNING IN A WIRELESS CHARGING SYSTEM, the contents of which is incorporated herein in its entirety.

BACKGROUND

Energy may be transferred wirelessly between two devices from an inductive component of a transmitting device to an inductive component of a receiving device. Alternatively, energy may be transferred wirelessly from a capacitive component of a transmitting device to a capacitive component of a receiving device. For ease of discussion and not by way of limitation, energy transfer via inductive components is discussed herein.

Energy transfer occurs when the receiving device is placed in the proximity of a magnetic field generated by the transmitting device. The magnetic field at the transmitting device is generated by exciting the coil at the transmitting device with an alternating current.

Power may be described mathematically as having a real component and an imaginary component, referred to as active power and reactive power, respectively. Generally speaking, active power is either transferred to a load or dissipated in parasitic components within or in close proximity of the system, whereas reactive power is stored in the system in the form of oscillating voltages and currents in reactive elements such as inductors and capacitors.

Ideally, all active power is transferred from the transmitting device to one or more receiving devices. However, power may be lost in the transmitting device, for example to heat, or lost when power is absorbed by metal objects near the transmitting device. Further, power may be lost in the receiving device.

Many other factors affect power transfer, including distance between transmitting and receiving devices, resonant frequency of transmitting and receiving devices, frequency at which the transmitter device is excited, number of receiving devices, objects other than receiving devices near the transmitting device, size and relative size of coils, and orientation of coils, to name just a few. It is desirable to optimize power transfer and efficiency.

It would be desirable, therefore, to have the capability to dynamically adjust one or more operating parameters of a transmitting device or receiving device to adapt to changing operating conditions, component tolerances, and component parameter drift over time. It would be useful to define a metric whose value adequately indicates the power transmission efficiency and an amount of power or a relative amount of power being transferred. Such a metric may then be used in determining appropriate operating parameters to adjust.

DETAILED DESCRIPTION

Wireless power transfer may be achieved by coupling energy from an inductive component in a power delivery device (transmitter) to an inductive component in a power receiving device (receiver). Alternatively, capacitive components may be coupled. Power transfer or the efficiency of power transfer may increase or decrease depending on operating and environment conditions of a system including a transmitter and at least one receiver. To provide the capability to adjust the amount of power transferred in response to changing conditions, a transmitter or receiver may include components having tunable parameters such as tunable circuit parameters, tunable frequency, or tunable phase. A metric may be used to identify when to modify tunable parameters and how much to modify the parameters.

A first metric is derived from information received via communication between a wireless power transfer transmitter and receiver. A second metric is derived from input voltage and current measurements. A third metric is derived from input voltage and current measurements and from coil voltage.

In some implementations tunable parameters may be used for impedance matching or the like. Tunable parameters include without limitation frequency, phase, capacitance, and inductance.

In some implementations a resonant circuit may be used to maximize power transfer. Resonance is achieved when voltage and current of the source are in phase. One tunable parameter that may be used to achieve resonant or near resonant operation is the excitation frequency of the resonant circuit. This frequency may be controlled to achieve optimal operation in different operating conditions. The second and third metric described below include information related to the phase difference between source voltage and current. The second and third metric are used in control of the excitation frequency and other tunable parameters.

Figure 1:
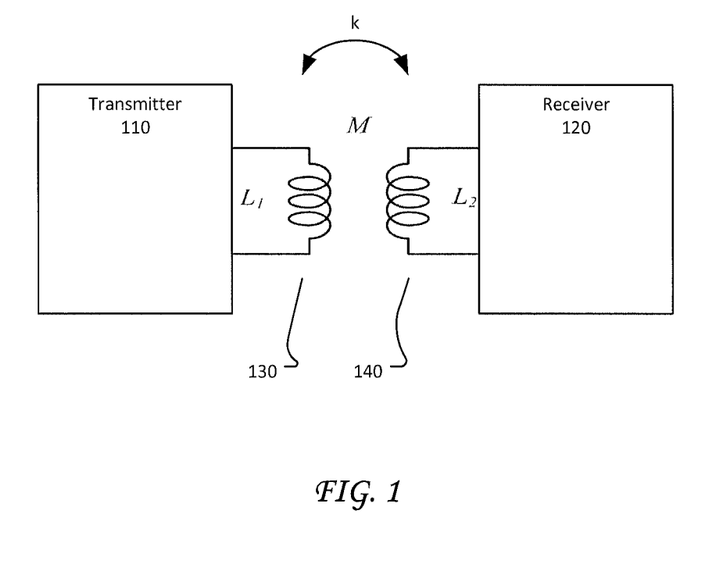
FIG. 1 illustrates an exemplary wireless power transfer system with a transmitter and a receiver.

FIG. 1 illustrates an exemplary wireless power transfer system 100 with a transmitter 110 and a receiver 120. Transmitter 110 includes coil 130 having inductance L1. Receiver 120 includes coil 140 having inductance L2. Coils 130 and 140 are coupled with coupling coefficient k, which is at least in part a function of distance between the coils and relative orientation of the coils. A mutual inductance M is established between coils 130 and 140 at least in part as a function of coupling coefficient k and inductances L1 and L2. The mutual inductance M and coupling coefficient k affect the amount of power transferred, and it is therefore desirable to model system 100 in such a way that the effects of M and k may be analyzed.

Figure 2:
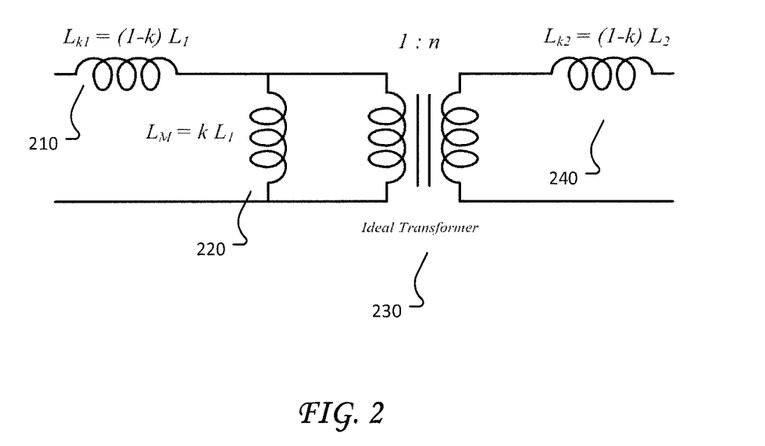
FIG. 2 illustrates an exemplary equivalent electrical model for coils in a wireless power transfer system.

FIG. 2 illustrates an equivalent electrical model for the coils in the system 100 shown in FIG. 1. Coils 210, 220, and 240 together with ideal transformer 230 model the effect of the coupling of coils 130 and 140 in FIG. 1. Coils 210, 220, and 240 as modeled have the inductances shown in equations 1, 2, and 3, respectively.

$$L_{k1} = (1-k) \cdot L1 \quad (1)$$

$$L_M = k \cdot L1 \quad (2)$$

$$L_{k2} = (1-k) \cdot L2 \quad (3)$$

Coupling coefficient k is defined in equation 4.

$$k = \frac{M}{\sqrt{L1 \cdot L2}} \quad (4)$$

Ideal transformer 230 in the equivalent circuit of FIG. 2 is illustrated as having a 1:n turns ratio, where n is defined in equation 5.

$$n = \sqrt{\frac{L2}{L1}} \quad (5)$$

As coupling coefficient k decreases, for example due to increased distance between the coils, power transferred between the coils decreases. Circuits on the transmitter or receiver may be tuned for improved power transfer. Tuning may be used to match the resonant frequencies of transmitter and receiver circuits.

Figure 3:
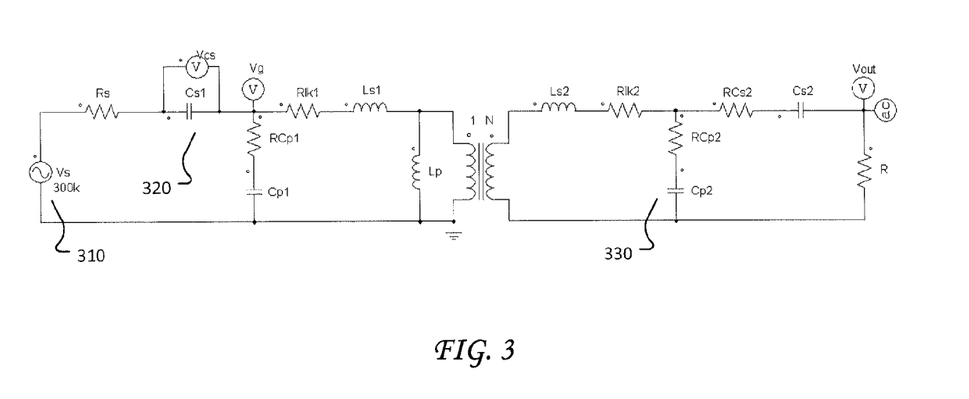
FIG. 3 illustrates an exemplary wireless power transfer system model using a coupled coil model.

FIG. 3 illustrates an exemplary system 100 model using the coupled coil model of FIG. 2 with tuning circuits on both the transmitter and receiver side. Capacitors 320, 330 and 340 are tunable such that capacitance values Cs1, Cp1, and Cp2 are variable, respectively. Power source 310 produces a voltage Vs and current Is, and is tunable such that source frequency and phase are variable. Thus, either the transmitter or receiver is tunable. Other tunable circuits may be alternatively implemented, and may include different tunable parameters. For example, inductance and power source phase may also be tunable. Further, a receiver may also include a tunable power source.

A metric may be defined to provide a relative measurement of the power transfer between a transmitter and a receiver. The metric may then be used to dynamically determine whether tuning of a circuit is desirable and, if so, how much tuning should be done.

A metric M1 is defined in equation 6 as a basic measure of power transfer effectiveness. In equation 6, Pout is the average power delivered to a load and the symbol eta (η) represents total system efficiency as measured by the ratio of average system 100 output power to average system 100 input power.

$$M1 = Pout \cdot \eta \quad (6)$$

Metric M1 increases with increases in power delivered to the load or increases in efficiency. Metric M1 is equal to zero when either power delivered to the load is equal to zero or efficiency is equal to zero. Thus, metric M1 provides a relative measure of power transfer effectiveness that is useful in tuning a system 100.

Metric M1 requires knowledge of electrical measurements on both the transmitter and receiver. In a system with communication between transmitter and receiver such information may be readily available. However, not all wireless power transfer systems include communication capability between transmitter and receiver. Even in systems with communication capability, the communication may not include the information needed to calculate metric M1. Thus, it is desirable to define a different metric that does not rely on communication between the transmitter and receiver.

A second metric, M2, is defined in equation 7 for use in systems where electrical system parameters are not part of the communication between transmitter and receiver, or in systems without communication between transmitter or receiver. In equation 7, Vs is the source voltage and Is is the source current, where the source is a power source at the transmitter. Vs and Is are defined in equation 8 and equation 9, respectively.

$$M2 = Re(Vs \cdot Is^*) \quad (7)$$

$$Vs = |Vs|e^{j\omega t} \quad (8)$$

$$Is = |Is|e^{j\omega t + \phi} \quad (9)$$

Using equations 7-9, metric M2 may be rewritten as shown in equation 10.

$$M2 = |Vs| \cdot |Is| \cdot \cos(\phi) \quad (10)$$

For systems such as those illustrated in FIG. 3, metric M2 exhibits a peak under the same operating conditions as M1. Therefore, although M2 is based on measurements made only on the transmitter, M2 is also an effective relative measure of power transferred to the receiver, useful in tuning a system 100.

In some implementations of a wireless power transfer system it may be useful to limit source current of the transmitter. For example, as a parameter of the transmitter is changed during the tuning process, the voltage across the transmitter coil will change, therefore changing the magnetic field intensity generated by the transmitter. Metric M2 may increase as coil voltage increases; however, higher coil voltage does not necessarily indicate better power transfer efficiency. To maximize power transfer efficiency, it is preferable to maximize the ratio of active power to reactive power. In order to have a consistent comparison between metric values in different operating conditions it is convenient to keep the transmitter coil voltage (and therefore the transmitter magnetic field intensity) constant by limiting the input current.

Metric M2 matches metric M1 more closely under conditions of limited source current than when source current is not limited. Thus, if metric M1 describes a preferred measurement, metric M2 may provide an approximation of metric M1 under limited source current conditions.

Figure 4:
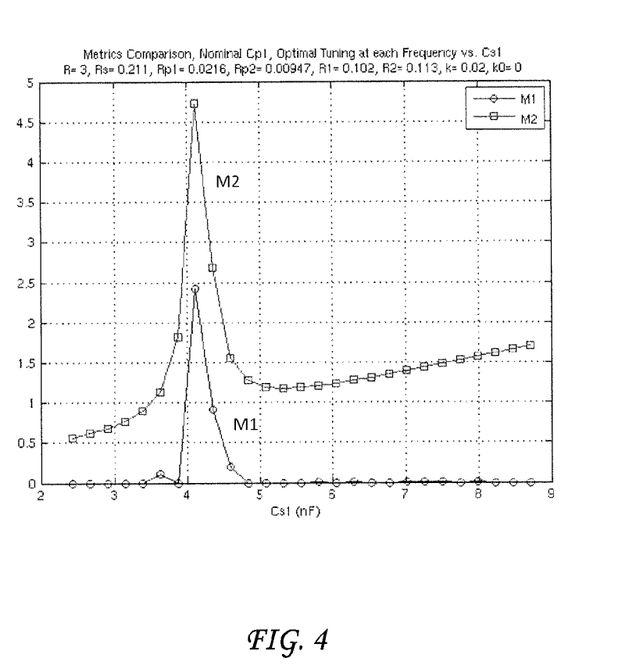
FIG. 4 illustrates an exemplary comparison of two metrics over a sweep of source frequencies and a sweep of capacitor values.

FIG. 4 provides a comparison of metrics M1 and M2 for the circuits of FIG. 3 over a sweep of source frequencies and a sweep of values for capacitor 320 using a current-limited voltage source. The following values for FIG. 3 circuit elements were used in the simulation: R=3Ω; Rs=0.211Ω; Rp1=0.0216Ω; Rp2=0.00947Ω; R1=0.102Ω; R2=0.113Ω; k=0.02; k0=0. At each capacitor 320 value Cs1 a sweep of the source frequency was performed and the optimal tuning frequency, as determined by a heuristic using one of the metrics, was plotted. As seen in FIG. 4, both metric M1 and M2 resulted in substantially similar optimal tuning under the given operating conditions.

As noted, metric M2 approximates metric M1 closely in systems with limited source current. It may be desirable to define a new metric for indicating power transfer that provides a good approximation of metric M1 without a limitation on source current.

Metric M3 is defined in equation 11. In equation 11, the term Vcoil is the voltage across the transmitter coil, and the term Vcoil_ref is an arbitrary normalization coefficient for the transmitter coil voltage, and may be equal to maximum coil voltage.

$$M3 = \text{Re}(Vs \cdot Is^*) \cdot \left(\frac{\text{Vcoil\_ref}}{Vcoil}\right) \quad (11)$$

$$= |Vs| \cdot |Is| \cdot \cos(\phi) \cdot \left(\frac{\text{Vcoil\_ref}}{Vcoil}\right)$$

Three metrics have been described for providing an indication of relative power transfer between the coils of a wireless power transfer system. Other metrics may also be used. For example, a metric may include only the magnitude information |Vs|*|Is|, or may only include phase information. Further, multiple metrics may be used; for example, one metric may be used for coarse tuning and one metric used for fine tuning.

Figure 5:
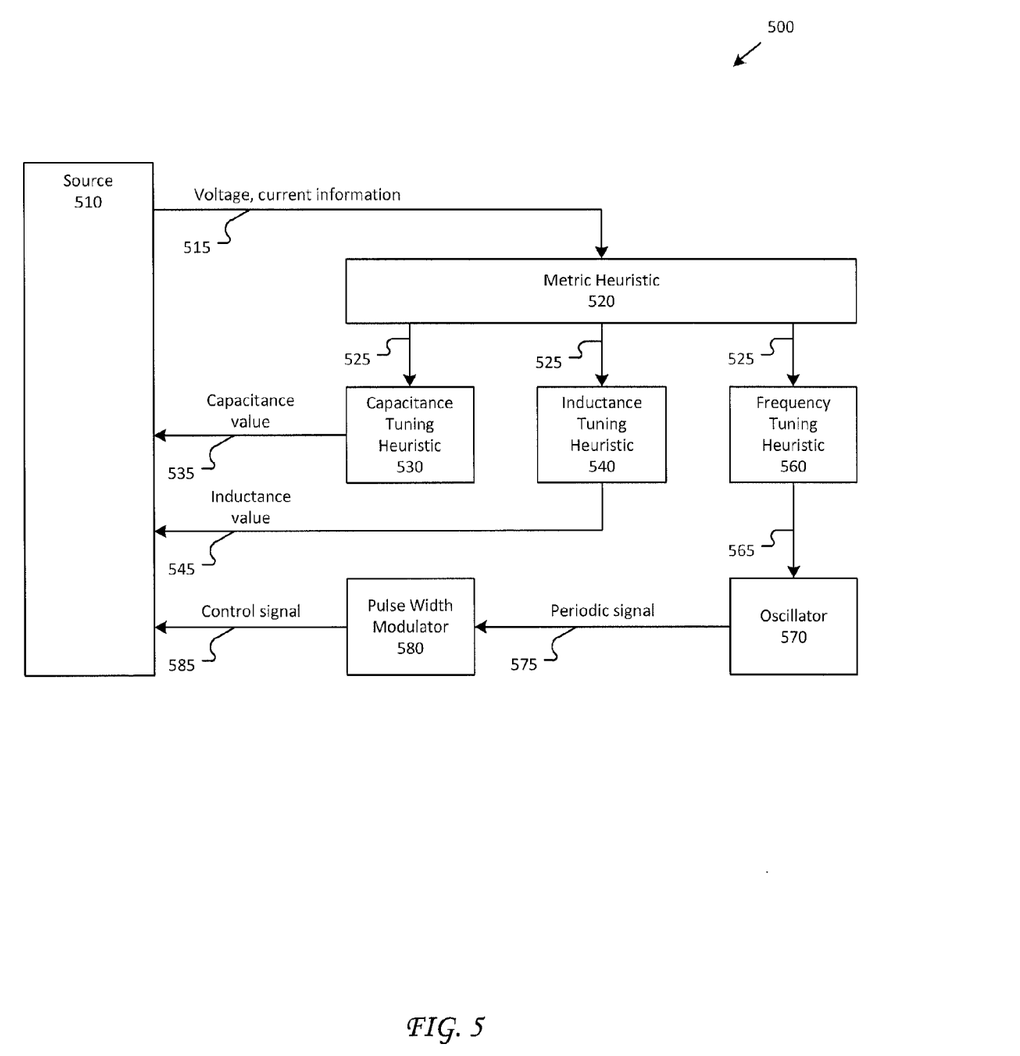
FIG. 5 illustrates an exemplary wireless power transfer device using metrics in the determination of one or more circuit parameters to adjust.

FIG. 5 illustrates a portion of a wireless device 500 using metrics in the determination of one or more circuit parameters to adjust for tuning wireless device 500. Blocks 520, 530, 540, 560, 570, and 580 represent functions of wireless device 500. Arrows shown in FIG. 5 indicate information provided between functional blocks. Information may be provided as, for example and without limitation, electrical signals, data, pointers, memory locations or offsets, function calls, and arguments. Information is transferred via an appropriate medium, such as wires, communication interfaces, and the like.

In FIG. 5, a source 510 provides energy to circuitry in the wireless device. Source 510 includes tunable parameters such as tunable circuit parameters. Information 515 regarding voltage and current produced by source 510 is provided to a metric heuristic 520 that determines the value of a metric (or metrics) and provides information 525 regarding the value to various tuning heuristics. The various tuning heuristics determine some further value based on information 525. Capacitance tuning heuristic 530 determines a capacitance value 535 for a tunable capacitor in source 510. Inductance tuning heuristic 540 determines an inductance value 545 for a tunable inductor in source 510 or for a tunable transmitter coil. Frequency tuning heuristic 560 determines a value 565 to use for adjusting an oscillator 570 that outputs a periodic signal 575 to a pulse width modulator 580 that in turn outputs one or more control signals 585 to circuits in source 510.

A heuristic, including heuristics 520, 530, 540, and 560 or other heuristics mentioned below, may be implemented in hardware, firmware, or software or some combination of hardware, firmware, and software.

Presented above was an overview of FIG. 5. Details of the components of FIG. 5 follow.

Information 515 may be electrical signals representing the voltage and current of source 510. For example, information 515 may include an analog or digital signal representing the voltage at one side of a wireless power transfer coil or current through the coil. Information 515 may be, for another example, a memory block storing voltage or current history. In yet another example, information 515 may be a set of values including magnitude and phase values for voltage and current. The examples given of information 515 are not limiting. Further, information 515 may include a combination of information types provided via multiple transmission media.

Metric heuristic 520 uses information 515 to determine the value of a metric such as metric M1, M2, or M3 described above. Metric heuristic 520 may determine the values for multiple metrics and may further select between the metrics according to the current environmental conditions. For example, a first metric may be used when only one receiver is being charged via wireless power transfer whereas a second metric may be used when multiple receivers are being charged. For another example, as coil voltage changes different metrics may be applied. Further, multiple metrics may be used in metric heuristic 520.

Information 525 from metric heuristic 520 may include values calculated for the metrics or changes in the values of the metrics. Each block receiving information 525 may receive different information 525; such as information related to different metrics, or information in different forms.

Representative tuning heuristics 530, 540, and 560 shown in FIG. 5 are not limiting, and fewer, more, or different heuristics may be used. One or more heuristics may be combined. A heuristic may be divided into multiple heuristics.

Capacitance tuning heuristic 530 receives information 525 and determines a value 535 for one or more tunable capacitors in source 510, or an indication 535 of whether to increase or decrease the capacitance of one or more tunable capacitors. Inductance tuning heuristic 540 receives information 525 and determines a value 545 for one or more tunable inductors in source 510, or an indication 545 of whether to increase or decrease the inductance of one or more tunable inductors.

Frequency tuning heuristic 560 receives information 525 and determines information 565 to provide to oscillator 570. Information 565 may be, for example, a value for a desired frequency or a difference value between a desired frequency and the actual frequency of source 510. An example of a metric used by metric heuristic 520 to provide information 525 to frequency tuning heuristic 560 is given in equation 12, where metric Mdiff is representative of a phase difference between the voltage and current of source 510.

$$M\text{diff} = \text{sign}(Vs) \cdot \text{sign}(Is) \cdot \sin(\phi) \quad (12)$$

A value of Mdiff=0 indicates that voltage and current are in phase and therefore the circuit is operating at or near a resonance frequency. A simpler version of Mdiff uses only sign (Vs)*sign(Is) without the sin(□) term. The value for Mdiff may be used by frequency tuning heuristic 540 to provide information 565 to oscillator 570 regarding an amount to adjust oscillator 570 frequency, for example to approach resonance and thereby improve power transfer.

Oscillator 570 outputs a periodic signal 575 based on information 565. For example, oscillator 570 may output a sine wave or square wave at a desired frequency specified by information 565. In another example, oscillator 570 may adjust the frequency of a periodic signal 575 by an amount indicated in information 565.

Pulse width modulator 580 receives periodic signal 575 and outputs a pulse width modulated (PWM) control signal 585. Control signal 585 is a train of pulses of fixed amplitude with frequency and phase equal to the periodic signal 575. The duty cycle of control signal 585 may be variable. For the example of FIG. 5, control signal 585 may be a set of control signals applied to switching mechanisms in source 510 for generating a voltage or current at a certain frequency and phase.

Wireless device 500 illustrated in FIG. 5 thus uses information from source 510 to evaluate power transfer according to one or more metrics and adjust one or more parameters of source 510 to adjust the amount of power transferred.

Often source 510 is adjusted to increase power transfer, for example by tuning the power delivery circuit at or near a resonance frequency. However, source 510 may also be adjusted to decrease power transfer, for example during overload conditions or when a metal object is present.

The exemplary wireless device 510 of FIG. 5 illustrates power transfer analysis and adjustment based solely on metrics. Other implementations use metrics in addition to various feedback mechanisms for maintaining stability and control.

Figure 6:
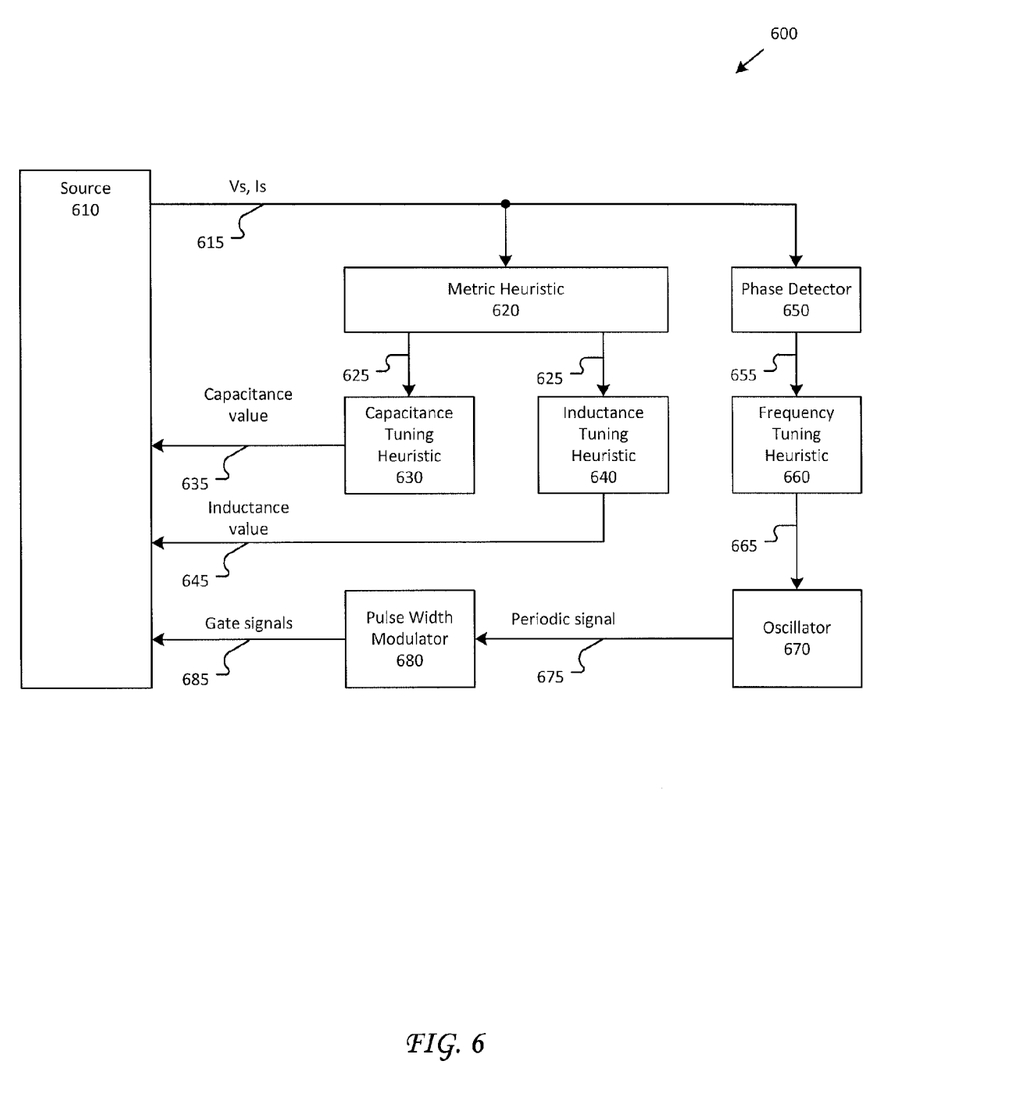
FIG. 6 illustrates an exemplary wireless power transfer device including metric analysis and a frequency tracking loop.

FIG. 6 illustrates an exemplary wireless device 600 including metric analysis and a frequency tracking loop. Blocks 620, 630, 640, 650, 660, 670, and 680 represent functions of wireless device 600. Arrows shown in FIG. 6 indicate information provided between functional blocks as described above with respect to FIG. 5.

In FIG. 6, a source 610 provides energy to circuitry in the wireless device. Source 610 includes tunable parameters such as tunable circuit parameters. Information 615 regarding voltage and current produced by source 610 is provided to a metric heuristic 620 that determines the value of a metric (or metrics) and provides information 625 regarding the value to various tuning heuristics. The various tuning heuristics determine some further value based on the information 625. Capacitance tuning heuristic 630 and inductance tuning heuristic 640 are similar to capacitance tuning heuristic 530 and inductance tuning heuristic 540 of FIG. 5, respectively.

In a frequency tracking loop, a phase detector 650 monitors source 610 and provides source 610 phase information 655. Frequency tuning heuristic 660 determines a value 665 to use for adjusting an oscillator 670 that outputs a periodic signal 675 to a pulse width modulator 680 that in turn outputs one or more control signals 685 to circuits in source 610.

Presented above was an overview of FIG. 6. Details of the components of FIG. 6 follow.

Information 615 is substantially similar to information 515 of FIG. 5 as described above.

Metric heuristic 620, capacitance tuning heuristic 630, and inductance tuning heuristic 640 operate substantially similar to heuristics 520, 530, and 540 of FIG. 5, respectively, as described above.

Phase detector 650 receives voltage and current information 615 from source 610 and determines from information 615 the phase difference between the voltage and current of source 610. For example, a phase detection circuit of phase detector 650 may provide an analog electrical signal 655 representing the phase difference. In another example, phase detector 650 may analyze the voltage and current information 615 and provide a value 655 representing the phase difference.

Frequency tuning heuristic 660 receives phase information 655 from phase detector 650 and determines information 665 to provide to oscillator 670. Information 665 may be, for example, a value for a desired frequency or a difference value between a desired frequency and the actual frequency of source 610.

Oscillator 670 outputs a periodic signal 675 based on information 665. For example, oscillator 670 may output a sine wave or square wave at a desired frequency specified by information 665. In another example, oscillator 670 may adjust the frequency of a periodic signal 675 by an amount indicated in information 665.

Pulse width modulator 680 receives periodic signal 675 and outputs a pulse width modulated (PWM) control signal 685 in a manner substantially similar to that described for pulse width modulator 580 of FIG. 5 as described above.

Phase detector 650, frequency tuning heuristic 660, oscillator 670, and pulse width modulator 680 combined may be implemented in the form of a phase-locked loop (PLL). In such implementations, because the resonant frequency of a power transfer system is close to the resonant frequency of the transmitter, and because it is desirable to operate at the system resonant frequency, the PLL may be used to more quickly tune a transmitter. During tuning, following each stepping of a source 610 parameter such as inductance or capacitance, the PLL automatically and rapidly tunes the transmitter to the new system resonant frequency. Thus, tuning time is reduced to the time required for the parameter sweep.

Wireless device 600 illustrated in FIG. 6 thus uses information from source 610 to evaluate power transfer according to one or more metrics and adjust one or more parameters of source 610 to adjust the amount of power transferred. Substantially concurrently, a frequency tuning loop uses information from source 610 to tune the frequency of wireless device 600.

Often source 610 is adjusted to increase power transfer. However, source 610 may also be adjusted to decrease power transfer.

In addition to providing capability for adjusting power transfer, the tunable parameters of sources 510 and 610 provide the capability to detect metal objects located close to wireless device 500 or 600, respectively. For a wireless power transfer transmitter, selected values (or all values) of a tunable parameter may be applied in turn (i.e., a parameter sweep). A power transfer metric may be evaluated for each value of the tunable parameter. If the metric is substantially the same for each value of the tunable parameter then there is a metal object nearby that is absorbing power from the transmitter wirelessly. The transmitter may react by disabling power transfer to protect against an overload condition. Power transfer may be interrupted occasionally to perform a parameter sweep as described for metal detection.

Transmitters and receivers may be implemented in a variety of ways, and may be or may include at least one computing device. Examples of computing devices include, without limitation, a computer workstation, server, desktop computer, notebook computer, laptop computer, handheld computer, personal data assistant (PDA), smart phone, or any other device including an embedded processing device.

Computing devices generally include computer-executable instructions, where the instructions may be executable by one or more computing devices such as those listed above. In general, a processor receives instructions, for example from a memory or a computer-readable medium or the like, and executes these instructions, thereby performing one or more processes including one or more of the processes described herein. Such instructions and other data may be stored and transmitted using a variety of known computer-readable media.

A computer-readable medium (also referred to as a processor-readable medium) includes any tangible medium that participates in providing data (instructions, for example) that may be read by a computing device.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A transmitter circuit suitable for use in wireless power transfer to a power receiving device, the transmitter circuit operable with an alternating current power source; the transmitter circuit comprising:
   a transmitter coil;
   Power transfer circuitry coupled between the power source and the transmitter coil, and including at least one tunable reactive component;
   tuning heuristic circuitry configured to control power transfer from the power source to the power receiving device by tuning the at least one tunable reactive component based on a metric equal to:

$$|Vs| \cdot |Is| \cdot \cos(\phi) \cdot (Vcoil\_ref/Vcoil),$$

where, $|Vs|$ is the magnitude of the power source voltage, $|Is|$ is the magnitude of the power source current, $\phi$ is the phase difference between the power source voltage and power source current, Vcoil_ref is a normalization value, and Vcoil is the voltage across the transmitter coil.

2. The circuit of claim 1, wherein the at least one tunable reactive component comprises a tunable capacitance.

3. The circuit of claim 1, wherein the at least one tunable reactive component comprises a tunable inductance.

4. The circuit of claim 1, further comprising:
   an oscillator providing a periodic signal;
   a pulse width modulator controlling the frequency of the power source based on the periodic signal provided by the oscillator;
   a phase detector detecting the difference between the phase of the power source voltage and the phase of the power source current; and
   frequency tuning heuristic circuitry configured to adjust the oscillator based on the phase of the power source.

5. The circuit of claim 4, the oscillator, the pulse width modulator, the phase detector, and the frequency tuning heuristic circuitry being implemented as a phase-locked loop (PLL).

6. The circuit of claim 1, wherein the power source is configured with a tunable duty cycle, the duty cycle being adjusted to control transmitter magnetic field intensity and thereby adjust the amount of power being transferred.

7. A method suitable for use in wireless power transfer from a transmitter including a transmitter coil, to a power receiving device, the transmitter operable with an alternating current power source, comprising:
   controlling power transfer from the power source to the transmitter coil with power transfer circuitry that includes at least one tunable reactive component;
   tuning the at least one tunable reactive component based on a metric equal to:

$$|Vs| \cdot |Is| \cdot \cos(\phi) \cdot (Vcoil\_ref/Vcoil),$$

where, $|Vs|$ is the magnitude of the power source voltage, $|Is|$ is the magnitude of the power source current, $\phi$ is the phase difference between the Power source voltage and power source current, Vcoil_ref is a normalization value, and Vcoil is the voltage across the transmitter coil.

8. The method of claim 7, wherein the at least one tunable reactive component comprises a tunable capacitance.

9. The method of claim 7, wherein the at least one tunable reactive component comprises a tunable inductance.

10. The method of claim 7, further comprising adjusting the frequency of the power source based on the difference between the phase of the power source voltage and the phase of the power source current.

11. The method of claim 10, adjusting the frequency of the power source using a phase-locked loop (PLL).

12. The method of claim 7, further comprising adjusting a duty cycle of the power source to control transmitter magnetic field intensity and thereby adjusting the amount of power being transferred.

* * * * *